(12) United States Patent
Lam et al.

(10) Patent No.: US 6,819,552 B1
(45) Date of Patent: Nov. 16, 2004

(54) ENCLOSURE SYSTEM FOR A PORTABLE ELECTRONIC DEVICE

(75) Inventors: Lawrence Lam, San Jose, CA (US); Huy Nguyen, San Jose, CA (US)

(73) Assignee: palmOne, Inc., Milpitas, CA (US)

( * ) Notice: Subject to any disclaimer, the term of this patent is extended or adjusted under 35 U.S.C. 154(b) by 0 days.

(21) Appl. No.: 10/217,761

(22) Filed: Aug. 12, 2002

(51) Int. Cl.$^7$ ................................................ H05K 5/00
(52) U.S. Cl. .................... 361/683; 312/223.3; 340/700; 400/684; 248/221.2
(58) Field of Search ................ 361/679–687, 361/724–727; 312/223.1–223.6; 364/708.1; 340/407, 700; 400/680–685; 248/221.1–221.4

(56) References Cited

U.S. PATENT DOCUMENTS

| | | | | |
|---|---|---|---|---|
| 4,851,812 A | * | 7/1989 | Holmberg | 340/407.2 |
| 5,212,628 A | * | 5/1993 | Bradbury | 361/683 |
| 5,510,953 A | * | 4/1996 | Merkel | 361/680 |

* cited by examiner

Primary Examiner—Hung Van Duong
(74) Attorney, Agent, or Firm—Wagner, Murabito & Hao LLP

(57) ABSTRACT

A mechanism for protecting a portable electronic device, e.g., a handheld computer system. In one embodiment, the present invention is comprised of an encasing structure having an opening and configured to receive and have disposed therewithin the handheld computer system. The present invention is further comprised of a lifting device coupled to the encasing structure. The lifting device is adapted to raise the handheld computer system above the confines of the encasing structure and further adapted to lower the handheld computer system to a disposition therewithin the encasing structure. The encasing structure can be used to protect input/output ports or slots, I/Os externally disposed on side surfaces of the handheld computer system when the handheld computer system is disposed within the encasing structure, and the lifting device enables raising the handheld computer system above the confines of the encasing structure to provide access to the I/Os. In one embodiment, a push-push hinge can be utilized as the lifting device.

22 Claims, 21 Drawing Sheets

ENCLOSURE SYSTEM FOR A PORTABLE ELECTRONIC DEVICE

FIELD OF THE INVENTION

The present invention relates to a portable computer system. More particularly, the present invention provides a pop-up enclosure system which provides protection for a portable electronic device, e.g., a portable computer system.

BACKGROUND OF THE INVENTION

Because advances in technology have enabled the miniaturization of the components required to build computer systems, new categories of computer systems have been created. One of the newer categories of computer systems developed is the portable, palmtop, or "handheld" computer system, referred to as a personal digital assistant or PDA. Other examples of handheld computer systems include electronic address books, electronic day planners, electronic schedulers and the like.

A handheld computer system is a computer that is small enough to be held in the user's hand. As a result, handheld computers are portable and therefore readily carried about in a user's briefcase, purse, and in some instances, in a user's pocket. By virtue of its size, the handheld computer, being inherently lightweight, is therefore exceptionally convenient.

Many of today's portable computer systems are configured with a variety of externally disposed ports which may be wired, wireless expansion, accessory, and/or communication. For example, some parts are infra-red ports, expansion slots, display and sound controls, communication interface, e.g., serial interface and/or printer ports, USB connectivity, rotatable and/or extendible antennas, power connectors, and others which provide enhanced user interaction with a portable electronic device. The above listed components are commonly referred to as input/outputs or I/Os.

However, by virtue of the external disposition of the above-mentioned I/Os, they are susceptible to damage from such actions as being accidentally dropped or kicked, inadvertently being improperly touched or interconnected, and the like. Further, external disposition of I/Os can permit incidental debris, e.g., dust particles, pieces of paper, dirt, small bits of gum, etc., and water or other liquids to be lodged within an I/O. Additionally, depending upon the portable electronic device, some debris can work its way into the device, which can cause a malfunction or a failure of a portable electronic device. Exposed I/Os can also become weathered or corroded by direct exposure to the elements.

SUMMARY OF THE INVENTION

Accordingly, a need exists for a mechanism that provides protection to externally disposed I/Os of a portable electronic device. A further need exists for a mechanism that achieves the above listed need and which further provides ready access to those I/Os being protected.

Embodiments of the present invention are drawn to providing a pop-up enclosure system that provides protection to externally disposed I/Os of a portable electronic device and which further enables ready access to those I/Os. In one embodiment, the enclosure system can be push-push activated.

In one embodiment, the enclosure system includes an encasing structure having an opening and configured to receive and have disposed therewithin the handheld computer system. The enclosure system further includes a lifting device coupled to the encasing structure. The lifting device is adapted to raise the handheld computer system above the confines of the encasing structure and further adapted to lower the handheld computer system to a disposition therewithin the encasing structure, when the handheld computer system is coupled to the lifting device. The encasing structure protects I/Os externally disposed on side surfaces of the handheld computer system when the handheld computer system is disposed within the encasing structure, and the lifting device enables raising the handheld computer system above the confines of the encasing structure to provide access to the I/Os.

In one embodiment, the user may push down on the computer system to "pop" it down within the enclosure. In the closed state, the I/O ports are protected. When closed in this state, the user can also push down on the system, thereby releasing the mechanism causing the system to "pop" out of the enclosure. In this way, the system is a push-push mechanism for protecting externally disposed I/O ports on the computer system.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2I is side view illustration depicting a portable electronic device having an externally disposed input/output port which is protected by an enclosing apparatus, in accordance with one embodiment of the present invention.

DETAILED DESCRIPTION

Embodiments of the present invention are drawn to an enclosure system for a portable electronic device, e.g., a portable computer system. In the following description, for purposes of explanation, numerous specific details are set forth in order to provide a thorough understanding of the present invention. To one skilled in the art, the present invention may be practiced without these specific details. In other instances, well-known structures and devices are shown in block diagram form in order to avoid obscuring the present invention.

Embodiments of the present invention are discussed primarily in the context of a portable electronic device such as a portable computer system, e.g., a handheld computer system or a personal digital assistant. For purposes of the present application, the term "portable electronic device" is not intended to be limited solely to conventional handheld or portable computers. Instead, the term "portable electronic device" or "handheld computer system" is also intended to include any mobile electronic device. Such mobile devices include but are not limited to pagers and paging systems, wireless and cellular telephones, electronic address books, wrist-mounted electronic devices, and numerous other mobile devices. As such, for purposes of the present application, the terms "portable electronic device" and "handheld computer system" will be considered synonymous and will be used interchangeably. Furthermore, embodiments of the present invention can be implemented with other types of electronic devices including, but not limited to, a handheld computer system.

Figure 1A:
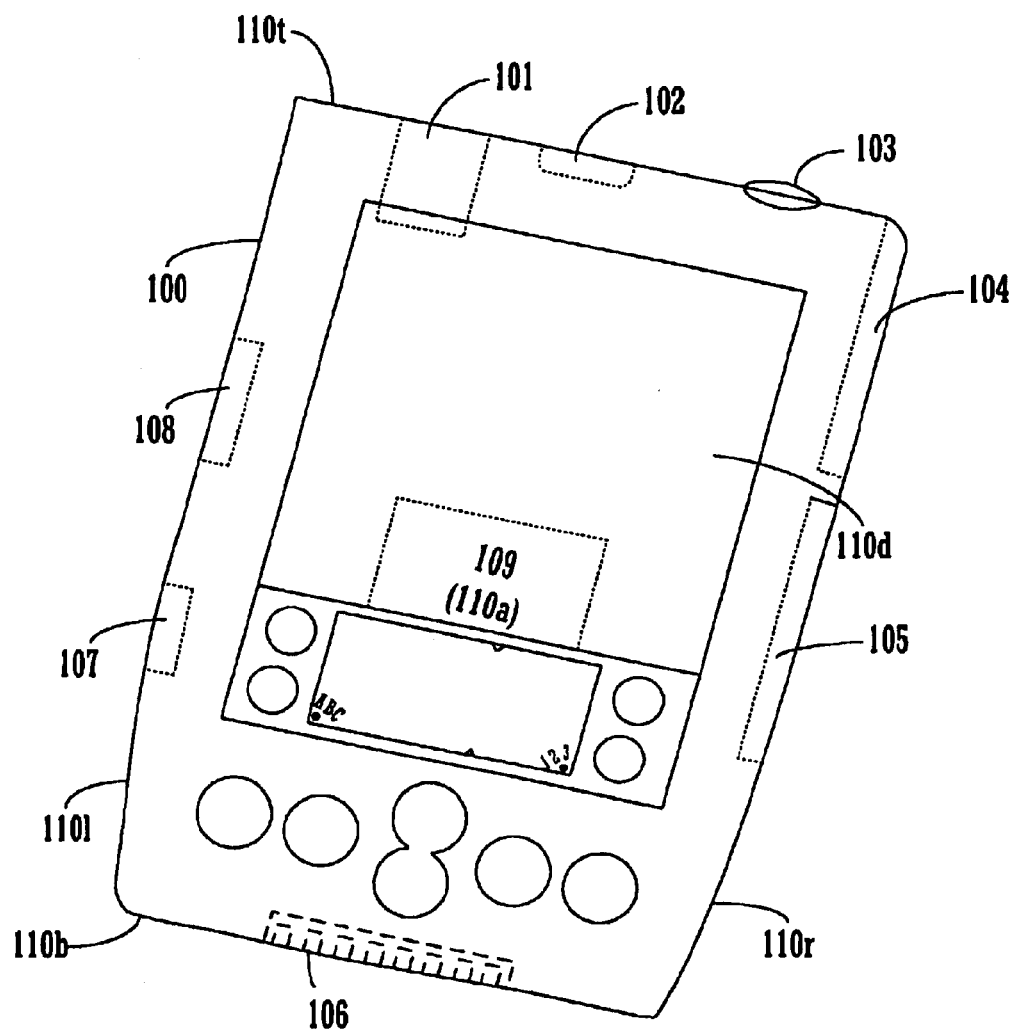
FIG. 1A is a front view of a portable electronic device upon which embodiments of the present invention may be practiced.

FIG. 1A is a front view illustration of a portable electronic device, e.g., handheld computer system 100, upon which embodiments of the present invention can be practiced. Handheld computer system 100 is shown having a top side edge portion indicated as 110$t$, a bottom side edge portion indicated as 110$b$, a left side edge portion indicated as 110$l$, and a right side edge portion indicated as 110$r$. Handheld computer system 100 is shown also having a display side 110$d$, the front facing side, and a rear facing side, 110$r$. Display side/front facing side 110$d$ is the side of handheld computer system 100 with the display device disposed thereon and rear facing side 110$r$ is that side of handheld computer system 100 opposite display side/front facing side 110$d$.

Still referring to FIG. 1A, handheld computer system 100 is shown having a plurality of input/output ports, e.g., I/Os, disposed along the perimeter edge surface thereof. For example, handheld computer system 100 can have externally disposed along the perimeter edge, but is not limited to, a expansion slot 101, an infra-red port 102, an on/off power button 103, an extendible/retractable antenna 104, a parallel port 105, an electrical/communication interface 106, a USB interface 107, and a display or volume control 108. Also shown is battery area 109, for storing user serviceable batteries. Battery area 109 and electrical/communication interface 106 are located on rear facing side 110r, the surface opposite display side 10$d$. It is noted that the number and location of I/Os on handheld computer system 100 is for illustrative purposes and should not be construed as a limitation. I/Os can be placed virtually anyplace on the surface of device 100 that does not conflict with an existing user interface element.

Figure 1B:
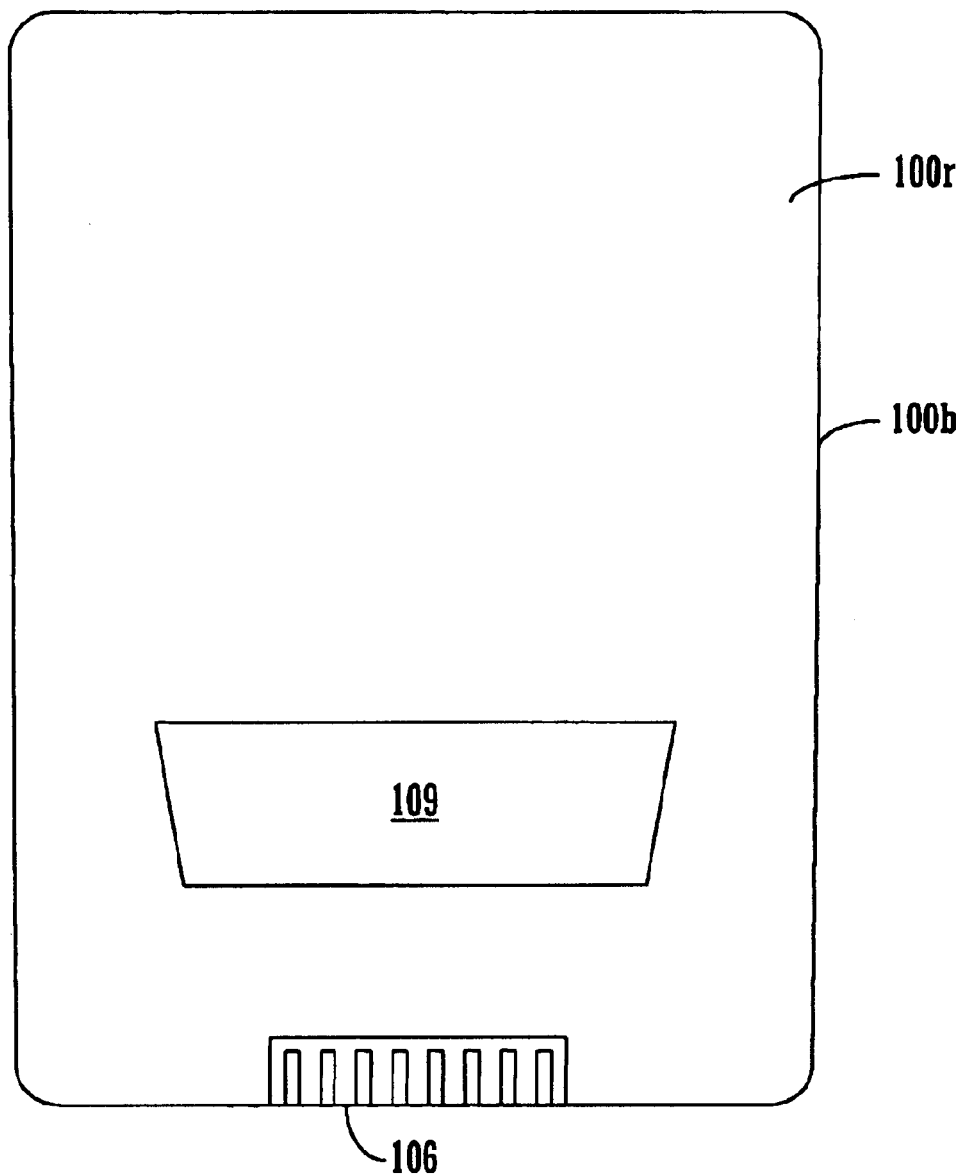
FIG. 1B is a rear view of a portable electronic device upon which embodiments of the present invention may be practiced.

FIG. 1B is an illustrated view of the rear portion (110$r$) of a portable electronic device, e.g., handheld computer system 100$b$, upon which embodiments of the present invention can be practiced. Shown are electrical/communication interface 106, and battery area 109.

Figure 1C:
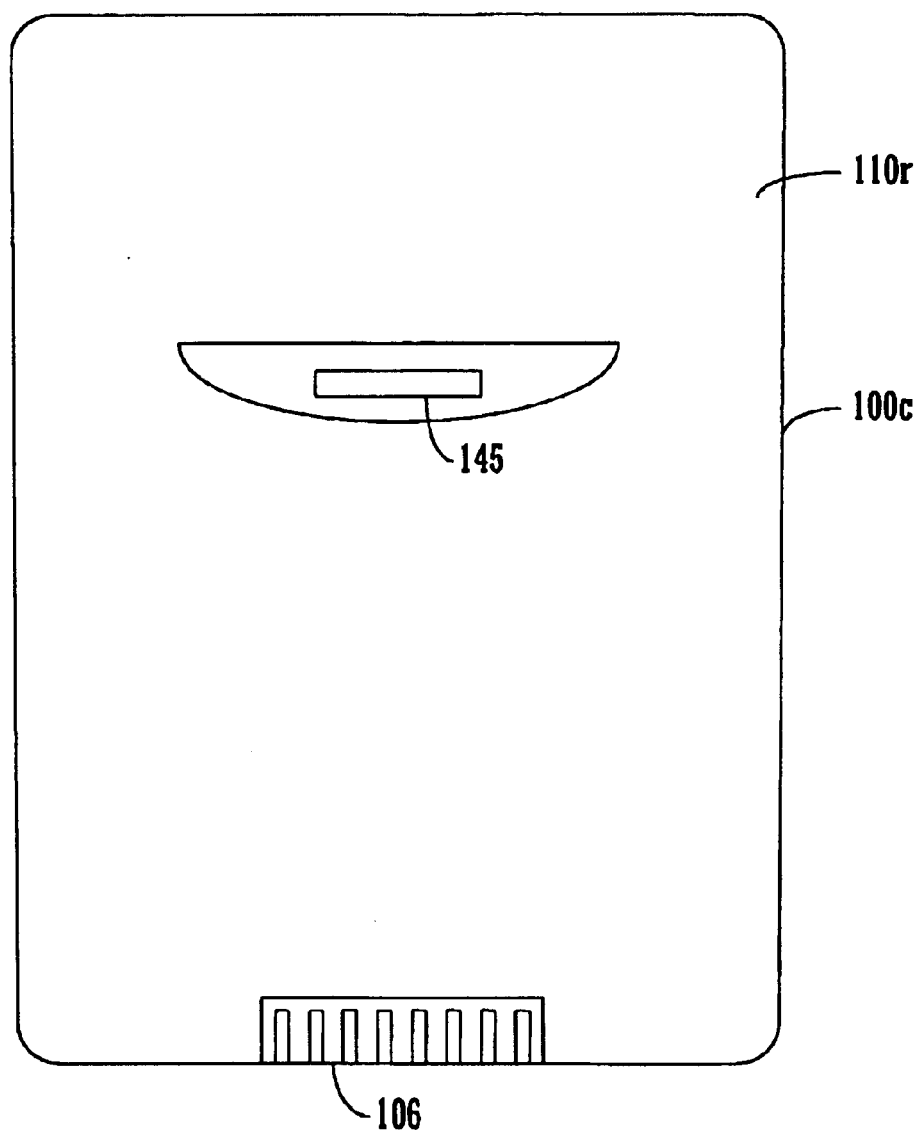
FIG. 1C is a rear view of another portable electronic device upon which embodiments of the present invention may be practiced.

FIG. 1C is an illustrated view of the rear portion (110$r$) of another portable electronic device, e.g., handheld computer system 100$c$, upon which embodiments of the present invention can be practiced. Shown are electrical/communication interface 106 and a secondary retention feature, e.g., receptacle 145. Receptacle 145 is adapted to receive therein a correspondingly configured insertable mechanical portion, e.g., insertable portion 245 of hinge 240$d$ of FIG. 2D. Receptacle 145, in one embodiment, enables handheld computer system 100$c$, analogous to handheld computer system 100 of FIG. 1A to be disposed proximal to and mechanically retained therewith another device, such as a docking or charging cradle, or in another implementation, coupled to an enclosure system, e.g., enclosure 200$d$ of FIG. 2D, in accordance with the present invention.

Figure 1D:
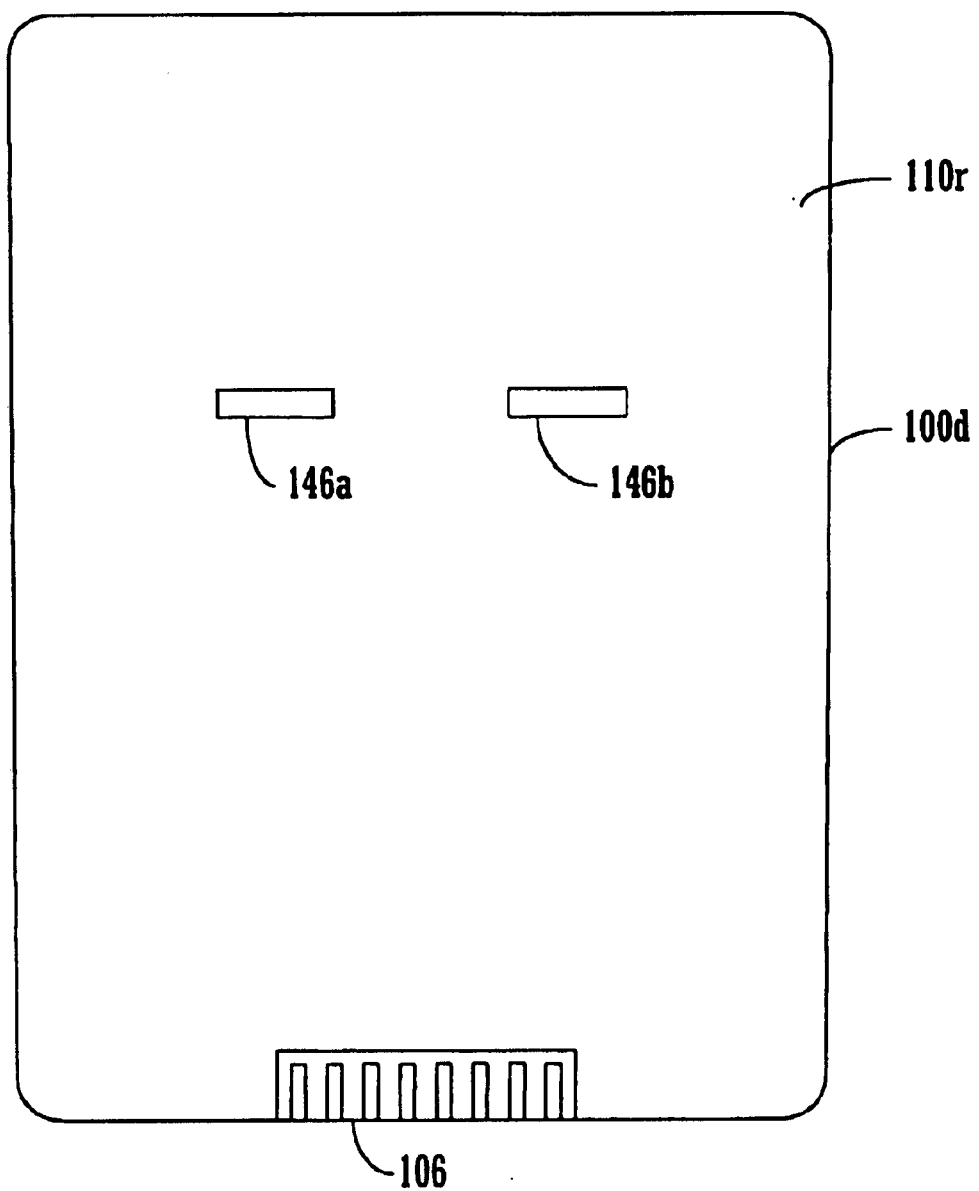
FIG. 1D is a rear view of yet another portable electronic device upon which embodiments of the present invention may be practiced.

Referring to FIG. 1D, in another example, a plurality of secondary retention features, e.g., receptacles 146$a$ and 146$b$ are disposed upon the rear portion (110$r$) of a handheld computer system 100$d$. Receptacles 146$a$ and 146$b$ are each adapted to receive a correspondingly configured insertable portion, e.g., insertable portions 246$a$ and 246$b$ of hinge 240e of FIG. 2E. Receptacles 146a and 146b, in one embodiment, enable handheld computer system 100d, analogous to handheld computer system 100 of FIG. 1A, to be disposed proximal to and mechanically retained therewith another device, such as a docking or charging cradle, or in another implementation, coupled to an enclosure system, e.g., enclosure 200e of FIG. 2E, in accordance with the present invention.

Figure 2A:
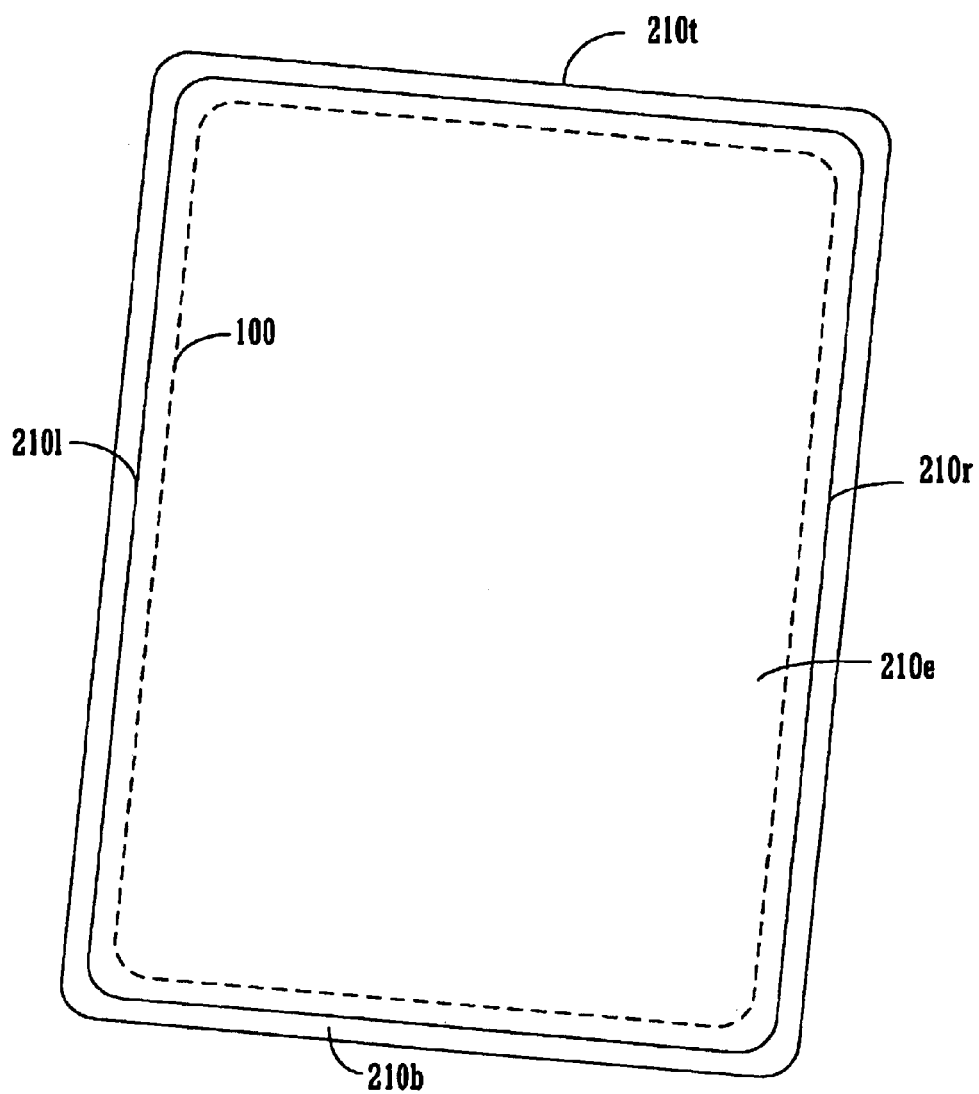
FIG. 2A is an illustration of an enclosing system adapted to encompass a portable electronic device, in accordance with one embodiment of the present invention.

FIG. 2A is an illustration of an enclosure system, enclosure 200, in one embodiment of the present invention. Enclosure 200 is adapted to protect externally disposed I/Os from damage. Enclosure 200 is adapted to encircle the perimeter edge of a portable electronic device, e.g., handheld computer system 100 of FIG. 1A, indicated as dotted line 100. Enclosure 200 is, in one embodiment, configured slightly larger than the perimeter of the portable electronic device it is adapted to enclose, enabling a handheld computer system 100 to be disposed therewithin. Accordingly, embodiments of the present invention are well suited to be utilized with nearly any portable electronic device including, but not limited to, a handheld computer system, e.g., handheld computer system 100 of FIG. 1A.

In one embodiment, enclosure 200 can have four connected side structures, e.g., top edge side 210t, bottom edge side 210b, left edge side 210l and right edge side 210r, thereby encompassing a handheld computer system which would be disposed therewithin. In another embodiment, enclosure 200 can also have a backing portion, e.g., back 210e, which can provide backing and support to portable electronic device 100. It is noted that by virtue of the angle of the illustration of enclosure 200 in FIG. 2, back 210e is not visible, but is indicated by a solid and dotted line.

Enclosure 200 also includes a lifting device, e.g., hinge 240 (shown in FIGS. 2D–2K) disposed within and coupled thereto, in one embodiment of the present invention. Hinge 240 enables a handheld computer system to be raised above the enclosing structures and lowered to a disposition within enclosure 200. In one embodiment, hinge 240 enables one end of handheld computer system 100 (110t) to be raised above enclosure 200 while the opposite end (110b) of handheld computer system remains disposed within enclosure 200, and vice-versa, as described in FIGS. 3B, 3C, and 3D.

Figure 2B:
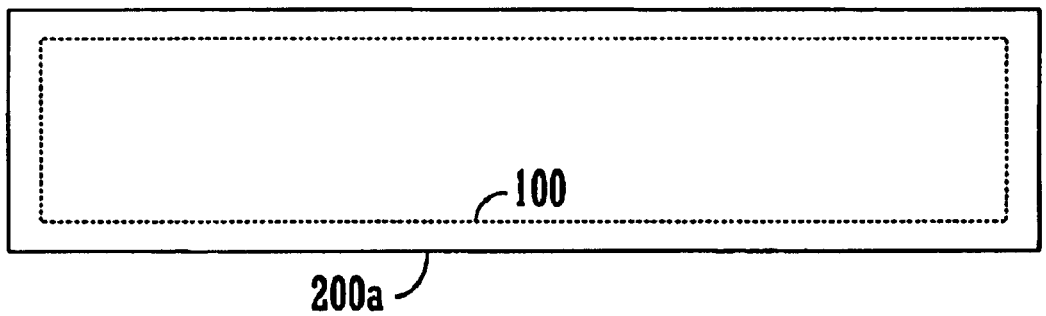
FIG. 2B is a side view block diagram illustrating a height dimension of an enclosing system, in accordance with one embodiment of the present invention.

FIG. 2B is side view illustration of an enclosing system 200b, analogous to enclosure 200 of FIG. 2A, in one embodiment of the present invention. In this embodiment, enclosing system 200b is approximately the same height as handheld computer system 100 (indicated by the dotted line) it is adapted to have disposed therewith in.

Figure 2C:
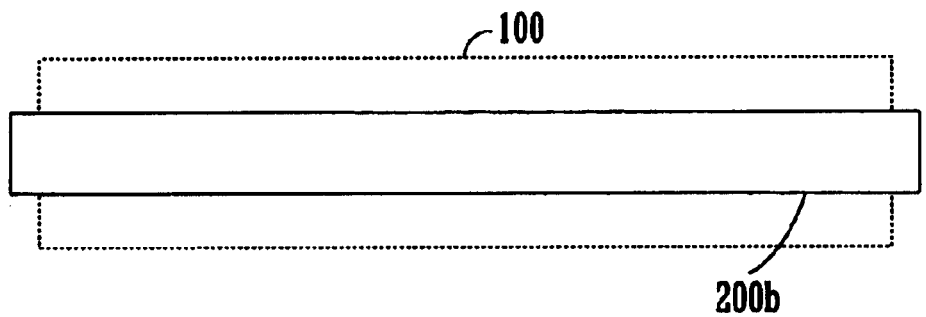
FIG. 2C is a side view block diagram illustrating an alternative height dimension of an enclosing system, in accordance with another embodiment of the present invention.

FIG. 2C is a side view illustration of an enclosing system 200c, analogous to enclosure 200 of FIG. 2A, in another embodiment of the present invention. In this embodiment, enclosing system 200c is smaller in height than handheld computer system 100 (indicated by the dotted line) it is adapted to have disposed therewithin.

Figure 2D:
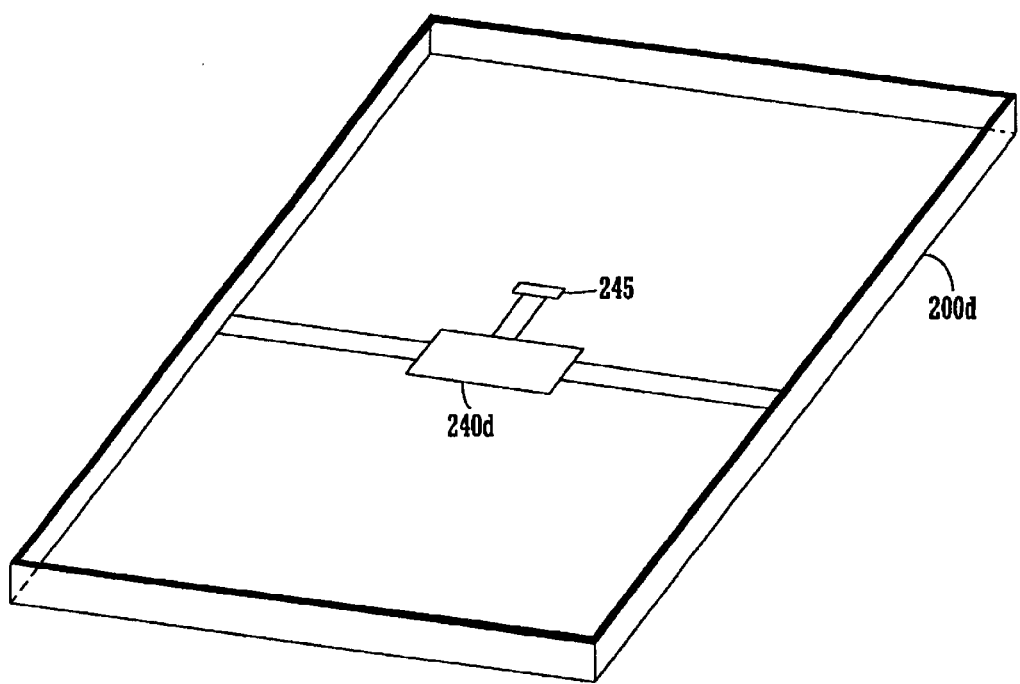
FIG. 2D is a top view perspective illustration of an enclosing system having a hinge device, in accordance with one embodiment of the present invention.

FIG. 2D is a top view illustration of an enclosing system, e.g., enclosing system 200d shown having lifting device, e.g., hinge 240d, coupled therewith, in one embodiment of the present invention. In this embodiment, hinge 240d is disposed amid enclosure 200d and is configured with an insertable mechanical portion 245 which is configured to be received in a secondary retention feature of handheld computer system 100d, e.g., receptacle 145 of FIG. 1C. Hinge 240d is adapted to have coupled thereto a portable electronic device, e.g., handheld computer system 100 having a rear portion 100c including receptacle 145, as shown in FIG. 1C. By utilizing a secondary retention feature provided by handheld computer system 100c, additional retentive mechanisms to retain coupling of a portable electronic device, e.g., handheld computer system 100c, to hinge 240d can be eliminated.

Figure 2E:
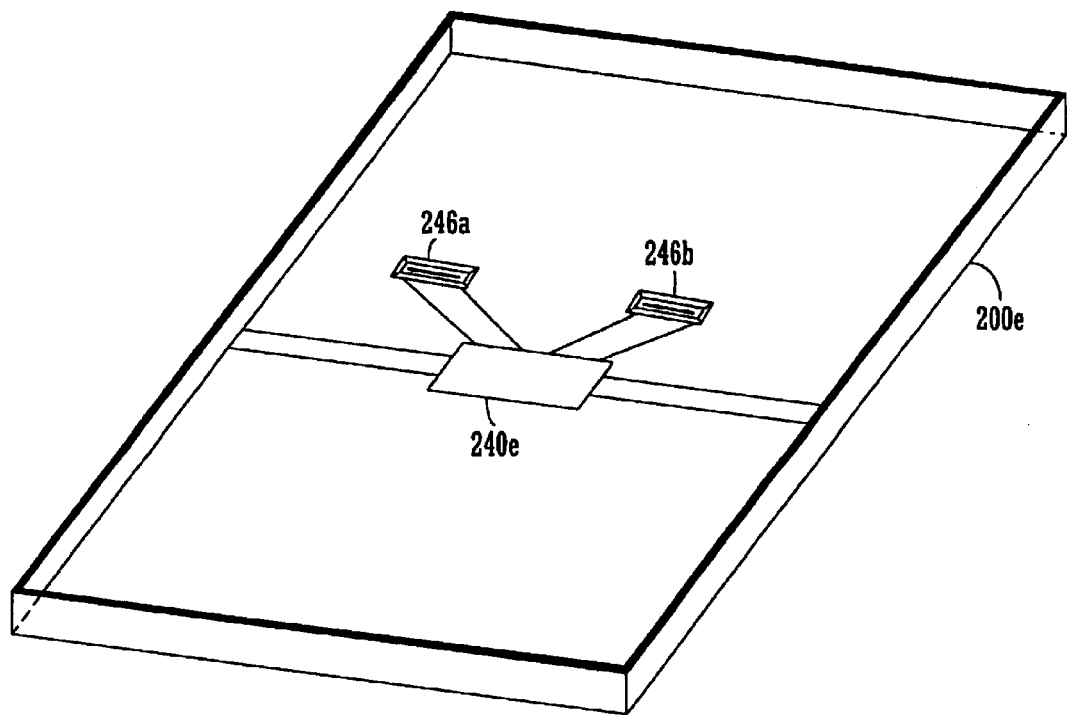
FIG. 2E is a top view perspective illustration of an enclosing system having another hinge device, in accordance with one embodiment of the present invention.

FIG. 2E is a top view illustration of an enclosing system 200e shown having a lifting device, e.g., hinge 240e, coupled therewith, in one embodiment of the present invention. In this embodiment, hinge 240e is disposed amid enclosure 200e and is configured with a plurality of insertable portions 246a and 246b which are configured to be received in secondary retention features of a handheld computer system 100, e.g., receptacles 146a and 146b of handheld computer system 100d of FIG. 1D. By utilizing the secondary retention features provided by handheld computer system 100d of FIG. 1D, the need for additional or alternative retentive mechanisms to retain coupling of a portable electronic device, e.g., handheld computer system 100d to hinge 240d, can be obviated.

Figure 2F:
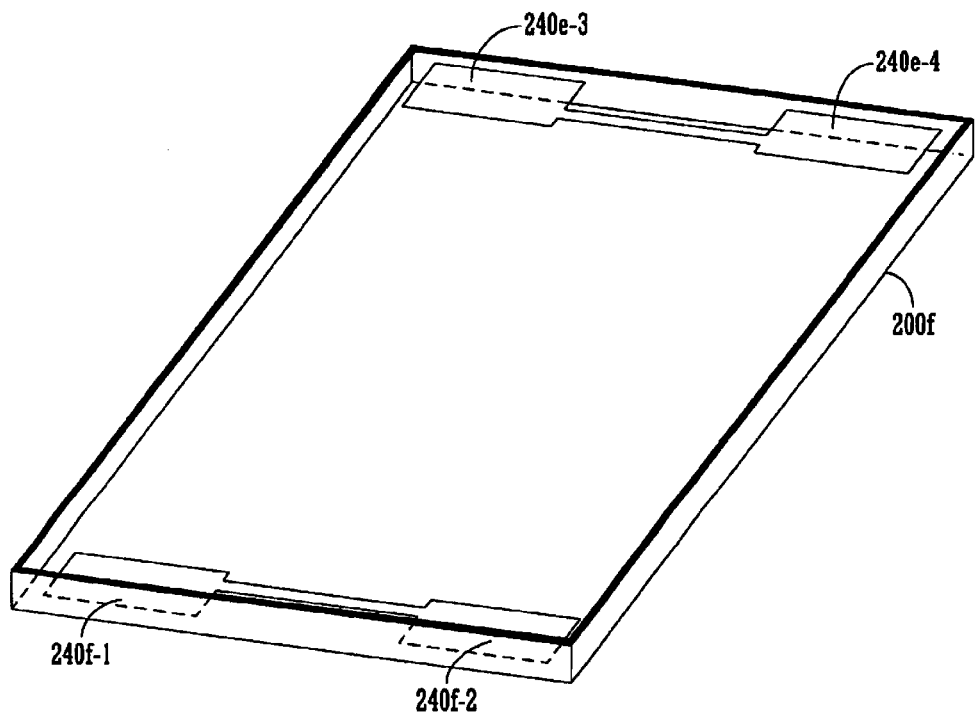
FIG. 2F is a top view perspective illustration of an enclosing system having a plurality of hinge devices, in accordance with another embodiment of the present invention.

FIG. 2F is a top view illustration of an enclosing system 200f shown having a plurality of lifting devices, hinges 240f-1 to 240f-4, coupled therewith, in another embodiment of the present invention. In this embodiment, hinges 240f-1 and 240f-2 are disposed at one end of enclosure 200f while hinges 240f-3 and 240f-4 are disposed at an opposite end. It is noted that hinge 240f can be disposed anywhere within the confines of enclosure system 200f, and that hinge 240f can instanced singularly, similar to hinge 240e of FIG. 2E, plurally, e.g., a pair of hinges 240f-1 and 240f-2, or in plural pairs as shown.

Figure 2G:
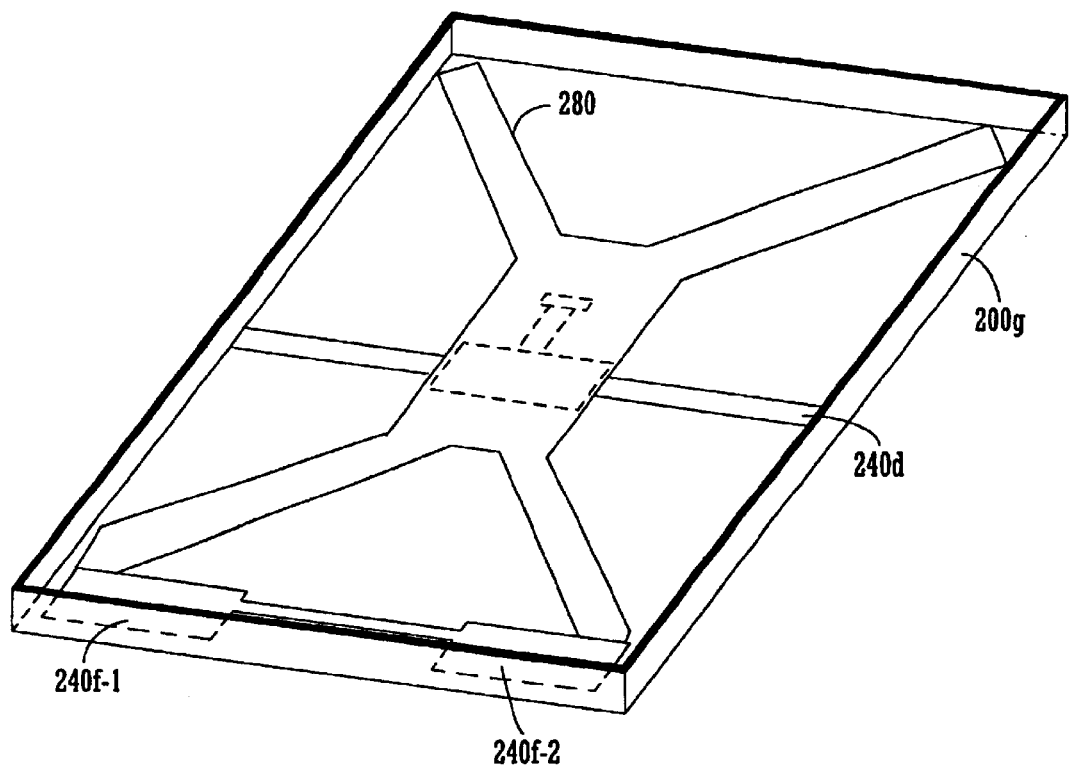
FIG. 2G is a top view perspective illustration of an enclosing system having a retainer coupled with a hinge device, in accordance with one embodiment of the present invention.

FIG. 2G is a top view illustration of an enclosing system 200g shown having a plurality of lifting devices, hinges 240f-1 and 240f-2, coupled therewith, in another embodiment of the present invention. In this embodiment, hinges 240f-1 and 240f-2 are disposed at an edge side portion of enclosure 200f. It is noted that hinges 240f-1 and 240f-2 can be disposed at any edge side portion of enclosure 200f or anywhere in-between. It is also noted that hinges 240f-1 and 240f-2 can also be disposed in pairs at opposing edge side portions of enclosure 200f. By virtue of hinges 240f-1 and 240f-2 not configured with insertable portions adapted to be received by a handheld computer system, as described in FIGS. 2D and 2E, alternative retention mechanisms need to implemented to retain a handheld computer system to hinges 240f-1 and 240f-2 in one example, a retainer, e.g., retainer 280, can be used as a retention mechanism, similar to prongs used to retain gems in a jewelry setting. In this retainer example, retainer 280 is configured to retain a handheld computer system by grasping the corners and is coupled with hinges 240f-1 and 240f-2. In another embodiment, retainer 280 is configured with a corresponding receptacle area for receiving the insertable mechanical portion 245 of hinge 240d, as indicated with a dotted line. In this manner, retainer 280 can be coupled with hinge 240d, and a handheld computer system 100d can be retained in retainer 280. In another example, a slot or receiving region, can be used as a retention mechanism, similar to a cassette slot for holding a cassette. It is noted that nearly any type of retentive mechanism can be implemented to couple and retain a handheld computer system to hinge 240. As such, retainer 280 is for illustrative purposes and should not construed as a limitation with regard to the configuration of the retentive mechanism used to retain a handheld computer system 100 to a hinge 240.

Figure 2H:
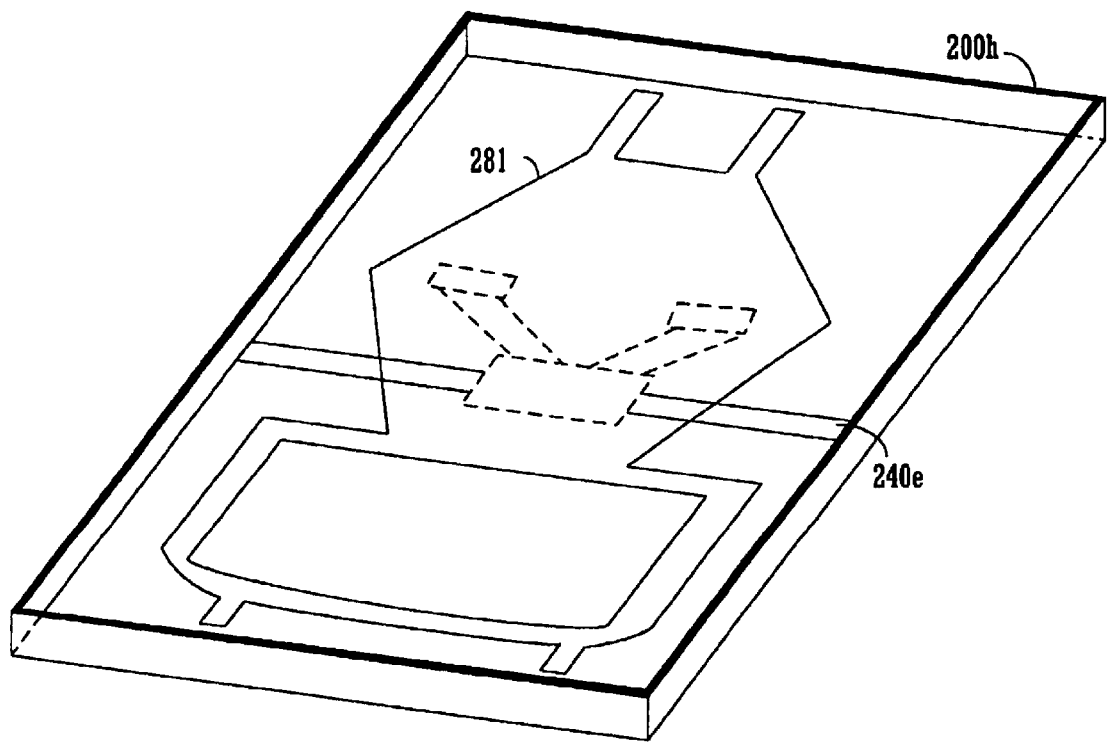
FIG. 2H is a top view illustration of an enclosing system having an alternative retainer coupled with a hinge device, in accordance with one embodiment of the present invention.
Figure 21:
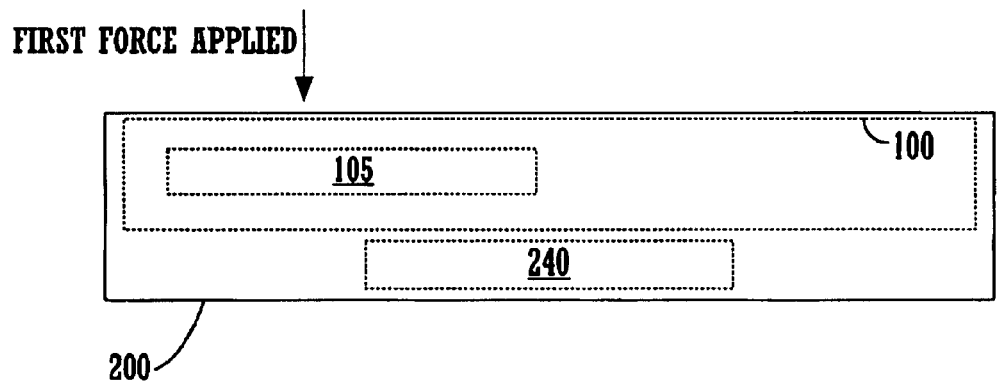

FIG. 2H is a top view illustration of an enclosing system 200h shown having a retainer, e.g., retainer 281 adapted to be coupled to a hinge, e.g., hinge 240e of FIG. 2E. Retainer 281 is configured to retain a handheld computer system, e.g., handheld computer system 100c of FIG. 1C. Retainer 281 is configured with a corresponding receptacle area for receiving the insertable mechanical portion 246a and 246b of hinge 240e, as indicated with a dotted line. In this manner, retainer 281 can be coupled with hinge 240e, and a handheld computer system 100c can be retained in retainer 280.

FIG. 2I is a side view illustration of an enclosure system, e.g., enclosure system 200 of FIG. 2, having a hinge, e.g., hinge 240 coupled therewith, in one embodiment of the present invention. In this illustration, a handheld computer system, e.g., handheld computer system 100 of FIG. 1A is shown disposed within the confines of enclosure system 200, indicated by a dotted line. Handheld computer system 100 is shown having an externally disposed I/O, e.g., I/O 105. I/O 105 is protected by enclosure 200 when within the confines thereof. Although in FIGS. 2I, J, and K, handheld computer system is shown having one I/O externally disposed, e.g., I/O 105, it is for illustrative purposes and should not be construed as a limitation. It is noted that nearly any number of I/Os can be externally disposed thereon and that enclosure system 200 can provide access to and protection for any number of externally disposed I/Os.

Still referring to FIG. 2I, in one embodiment, hinge 240 is a push-push type hinge. A push-push type hinge, also referred to as a push-to-activated hinge, is a hinge that is activated when pressed. For example, a first force (a downward push) is applied to a surface of handheld computer system 100 disposed within enclosure system 200. A push on handheld computer system activates hinge 240, and initiates lifting of handheld computer system 100.

Figure 2J:
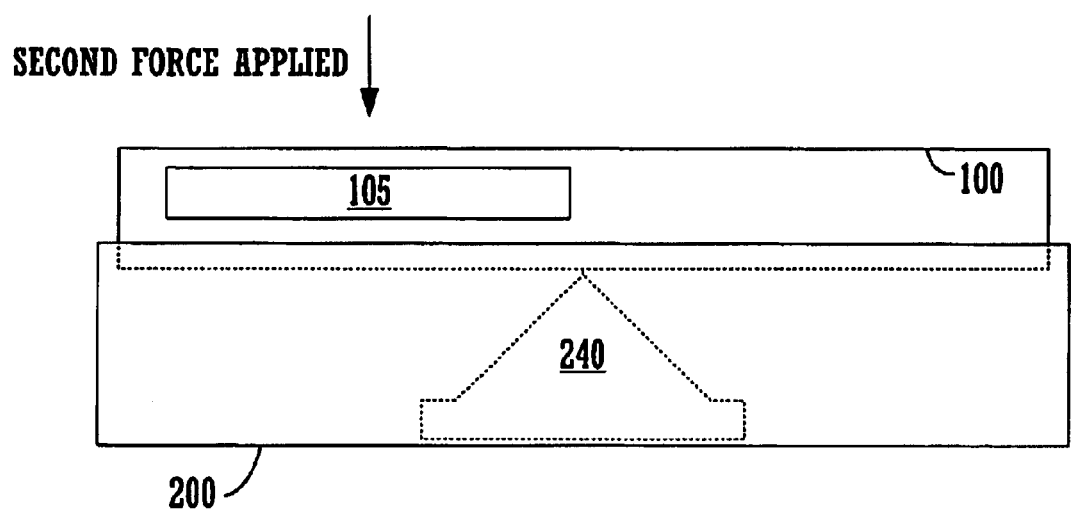
FIG. 2J is a side view illustration of the portable electronic device of FIG. 2G in a position for accessing the externally disposed input/output port, in accordance with one embodiment of the present invention.

FIG. 2J is a sequential illustration of enclosure system 200 of FIG. 2I subsequent to a first force being applied to a surface of handheld computer system 100. In this figure, hinge 240 has elevated handheld computer system nearly completely above the confines of enclosure system 200 (indicated by a solid and dotted line) which exposes I/O 105 thereby providing access thereto. Hinge 240 is configured to retain handheld computer system in an elevated position, as shown, until a second force (a downward push) is applied to a surface of handheld computer system 100.

Figure 2K:
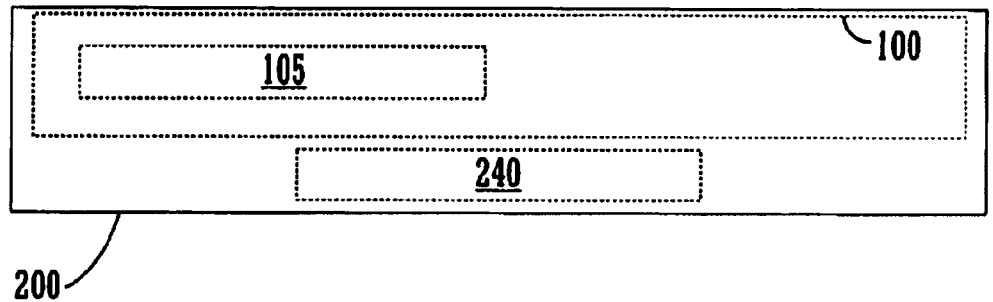
FIG. 2K is a side view illustration of the portable electronic device of FIG. 2H having been returned to a protected position within an enclosing system, in accordance with one embodiment of the present invention.

FIG. 2K is a sequential illustration of enclosure system 200 of FIG. 2J, subsequent to a second force being applied to a surface of handheld computer system 100. In this figure, hinge 240 has lowered handheld computer system 100 to a disposition within the confines of enclosure system 200, thereby providing protection to I/O 105.

It is noted that hinge 240 can be implemented singularly, plurally, in pairs, and in plural pairs, nearly anywhere within enclosure 200. Hinge 240 can be configured to comply with the form factor and retention features of nearly any type of handheld computer system. As such, hinges 240d, 240e, and 240f, as shown in FIGS. 2D, 2E and 2F, and hinge 240 of FIGS. 2I, J, and K, should be construed as illustrative, and not considered limiting with regard to location, instancing, or configuration.

Collectively referring to FIGS. 3A–3F, shown are illustrative examples of functionalities as provided by embodiments of the present invention.

Figure 3A:
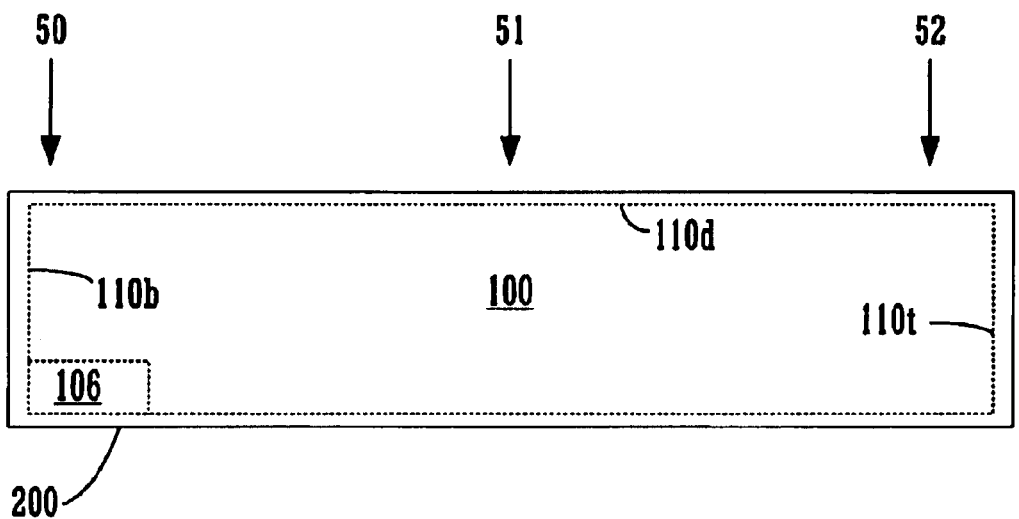
FIG. 3A is an illustration of an enclosing system with a portable electronic device disposed therein, in accordance with one embodiment of the present invention.

FIG. 3A shows a side view perspective of portable electronic device, e.g., handheld computer system 100 (indicated by a dotted line), disposed within enclosure 200, in one embodiment of the present invention. Enclosure 200 of FIGS. 3A 3F is analogous to enclosure 200 of FIGS. 2A 2F. Handheld computer system 100 of FIG. 3 is analogous to handheld computer system 100 of FIG. 1A. FIG. 3A depicts handheld computer system 100 in a recessed position, in one embodiment of the present invention. In one embodiment, a force can be applied to (e.g., to the exposed display side 110d of) handheld computer system 100 to extend handheld computer system 100 from within the confines of enclosure 200, exposing I/Os disposed along the peripheral edge surface thereof, as described in FIG. 1A. In one embodiment, force can be applied (pressing down) to handheld computer system 100 in a plurality of locations, as indicated by arrows 51, 52, and 53.

Figure 3B:
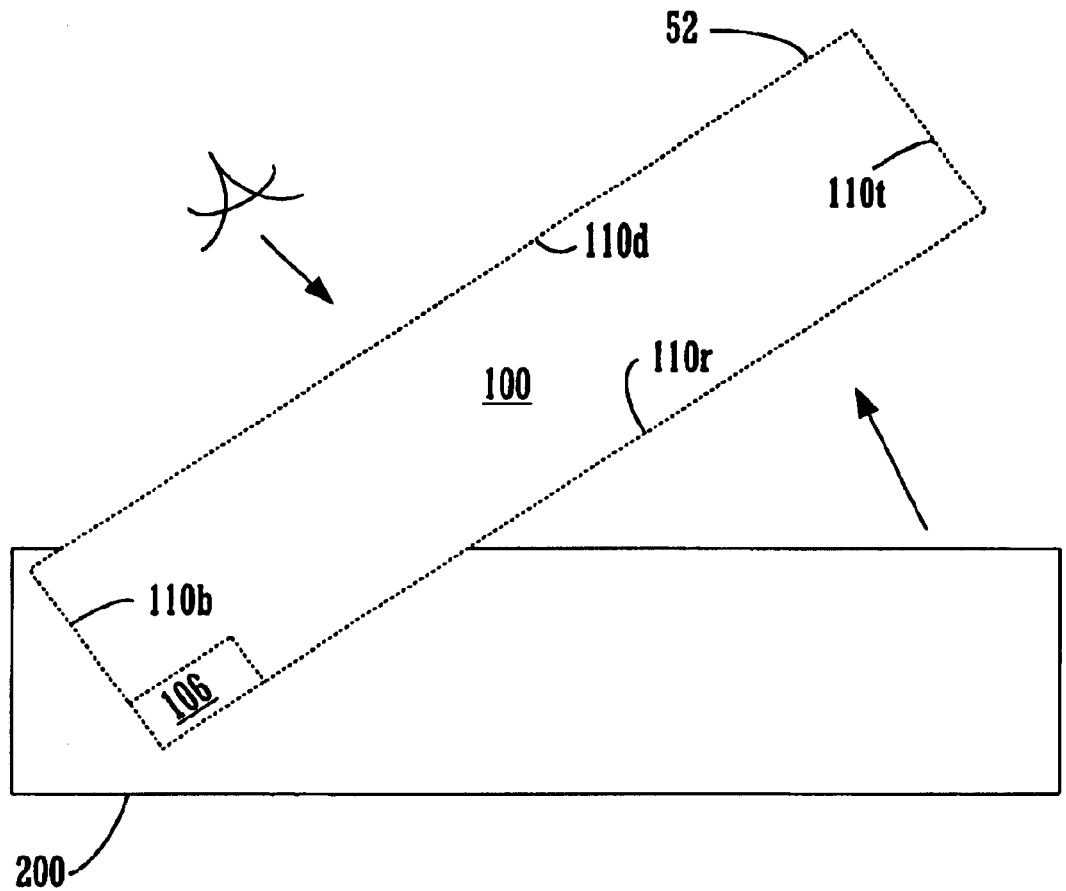
FIG. 3B is an illustration of an enclosing system with a portion of a portable electronic device disposed outside the confines of the enclosing apparatus, in accordance with one embodiment of the present invention.

In FIG. 3B, in another example and in a side view perspective, a force, e.g., a downward push, near top edge 110t of handheld computer system 100 was applied thereto, as indicated by arrow 52, and in accordance with one embodiment of the present invention, hinge 240 has raised that portion of handheld computer system 100 (110t) nearest the applied force (arrow 52) to a position extended above the confines of enclosure 200. It is noted that the opposite edge, bottom edge 110b of handheld computer system 100 remained within the confines of enclosure 200. In this example, handheld computer system 100 is in a customary viewing position, e.g., display device is right side up and oriented facing the user.

Figure 3C:
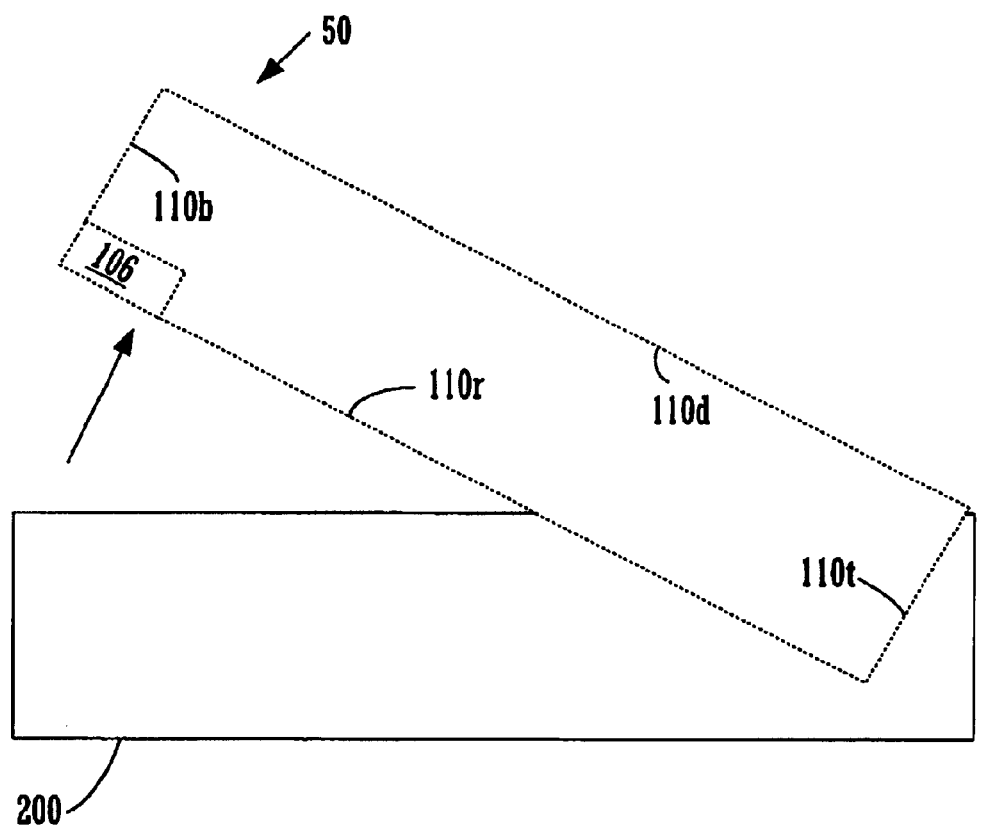
FIG. 3C is an illustration of an enclosing system with another portion of a portable electronic device disposed outside the confines of the enclosing apparatus therein, in accordance with one embodiment of the present invention.

In FIG. 3C, in another example and also in a side view perspective, a force, e.g., a downward push, near bottom edge 110b of handheld computer system 100 was applied thereto, as indicated by arrow 50, and in accordance with one embodiment of the present invention, hinge 240 has raised that portion of handheld computer system 100 (110b) nearest the applied force (arrow 50) to a position extended above the confines of enclosure 200, while the opposite edge, top edge 110t remained within the confines of enclosure 200.

Figure 3D:
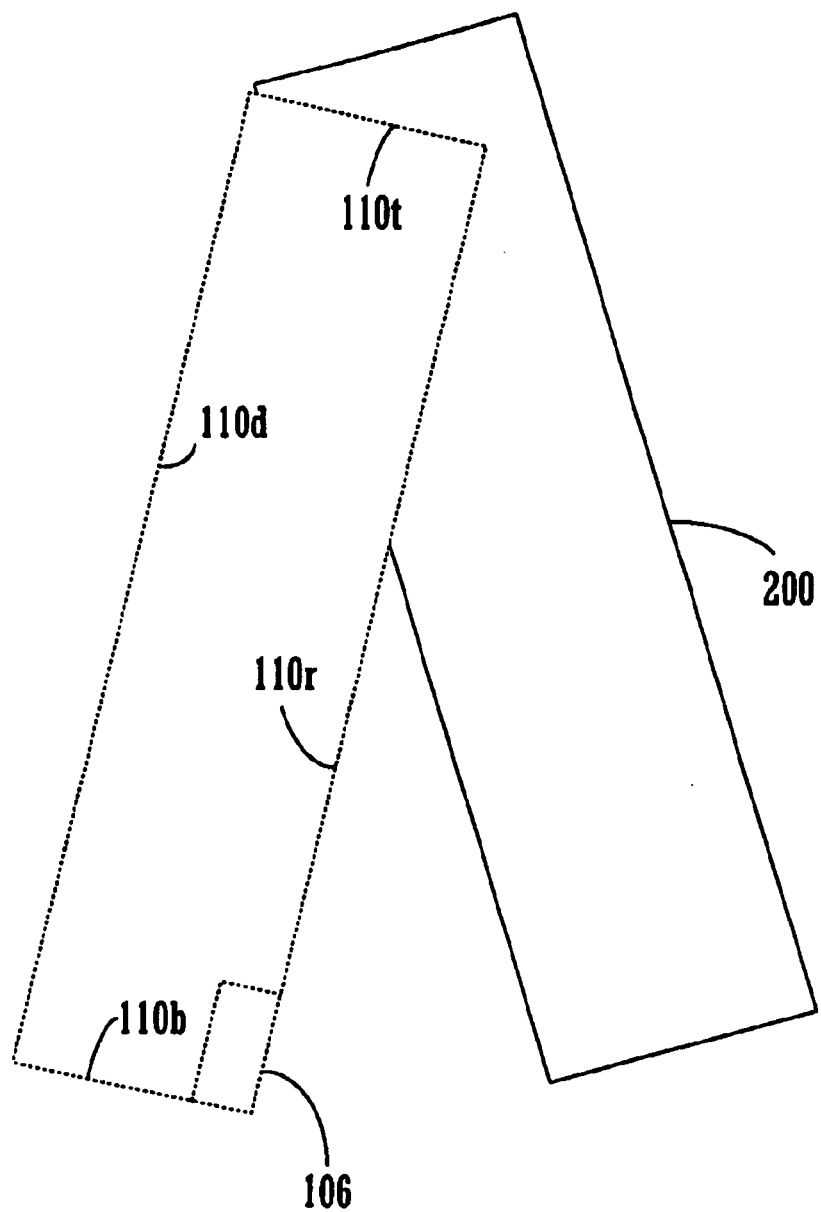
FIG. 3D is a sequential illustration of the enclosing apparatus and the portable electronic device of FIG. 3C oriented in a user viewing mode, in accordance with one embodiment of the present invention.

In FIG. 3D, in a side view perspective and continuing sequentially from FIG. 3C, enclosure 200 and handheld computer system 100 have been rotated from a horizontal position and an extended upward angle, respectively, as shown in FIG. 3C, to a more vertical position. In this position, enclosure 200 supports handheld computer system 100 in an upright or portrait viewing orientation. Further, by virtue of electrical/communication interface 106 being accessible, handheld computer system 100 can be coupled with a variety of devices and accessories including, but not limited to, a cradle for communication with other computer systems, electrical connectors for providing power or for recharging, a portable keyboard, and the like. Advantageously, by virtue of enclosure 200 providing support to handheld computer system 100 in an upright viewing orientation, enclosure 200 also reduces torsion at electrical/communicative interface 106 when coupled with various components and/or accessories.

Figure 3E:
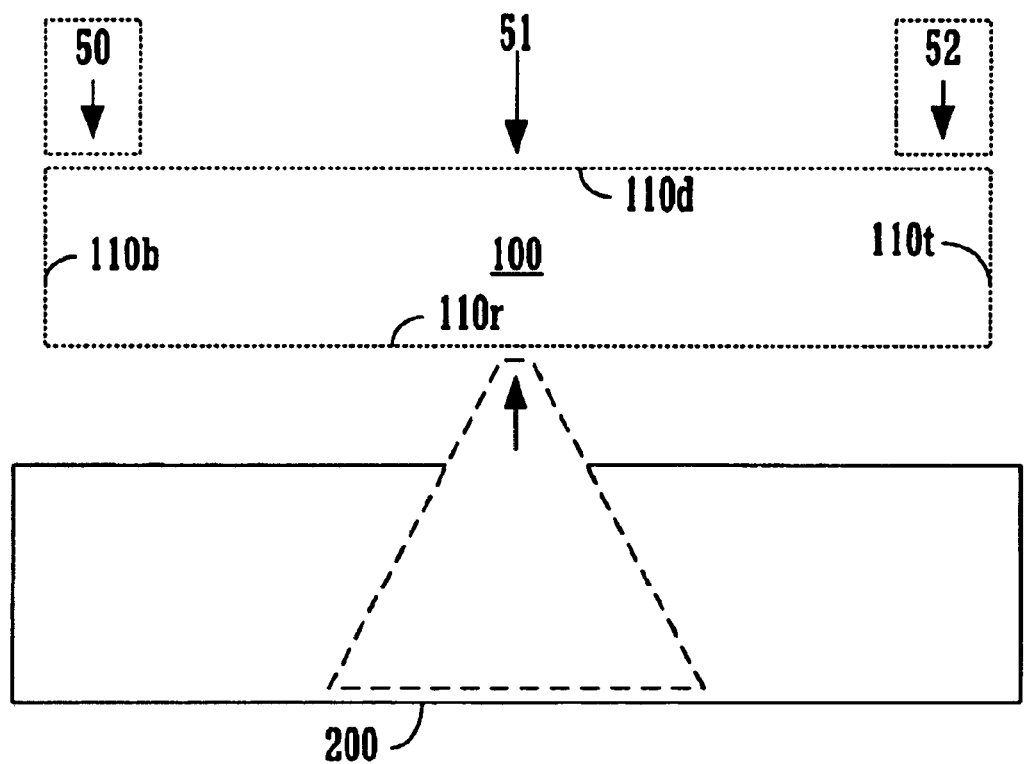
FIG. 3E is an illustration of an enclosing system with a portable electronic device entirely disposed outside the confines of the enclosing apparatus, in accordance with one embodiment of the present invention.
Figure 3F:
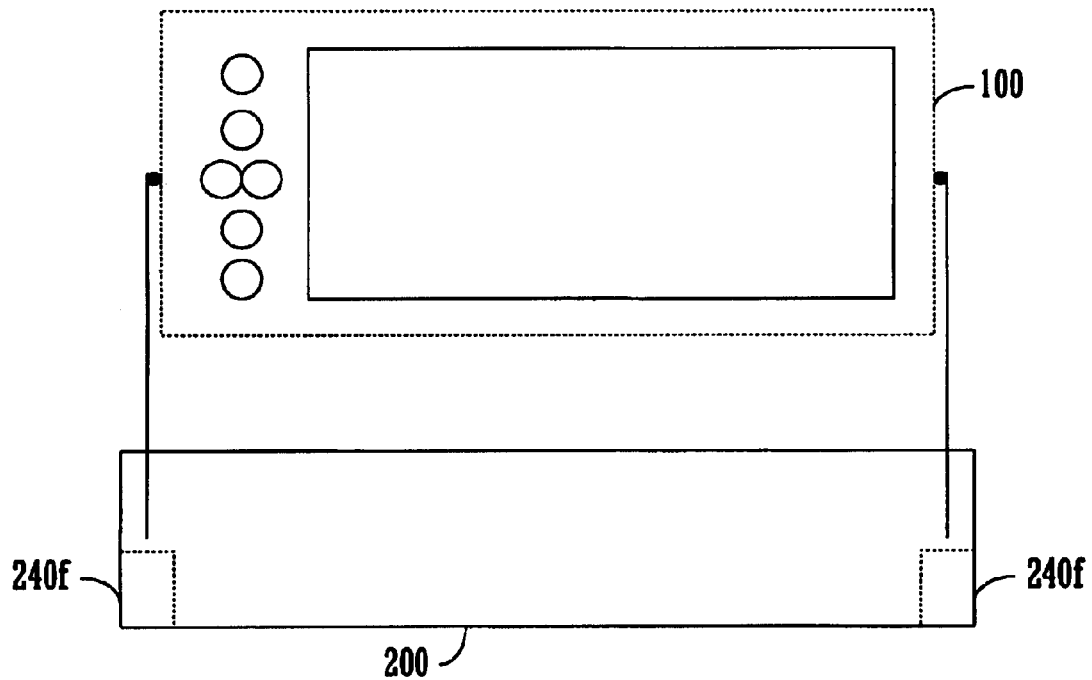
FIG. 3F is an illustration of an enclosing system with a portable computer system in a landscape viewing mode, in accordance with one embodiment of the present invention.

In FIG. 3E, in another example, a force, e.g., a downward push, approximately equidistant from top edge 100t and bottom edge 100b was applied to handheld computer system 100, as indicated by arrow 51, and in accordance with one embodiment of the present invention, hinge 240 raises handheld computer system 100 to a position fully extended above enclosure 200. Optionally, in another example, simultaneous force applied at top edge 100t and bottom edge 100b, as indicated by arrows 50 and 52 in dotted boxes, can achieve analogous results to a force applied at arrow 51, in another embodiment of the present invention. Another force at either arrow 51 or a both arrows 50 and 52 will activate hinge 240 and will cause handheld computer to be lowered back to its original position within enclosure 200.

FIG. 3F is a sequential illustration of FIG. 3E. In this figure, subsequent to handheld computer system 100 being extended fully above enclosure 200, handheld computer system 100 can be rotated about an axis to position a display device to be facing toward in a user, although in this example the display device is in a landscape or horizontal orientation. It is noted that in one embodiment, a hinge, e.g., hinge 240d or 240e, when so configured, can elevate handheld computer system 100 above enclosure system, as shown in FIG. 3E. In another embodiment, hinge 240f or a plurality thereof, when so configured, can be utilized to elevate handheld computer system 100 above the confines of enclosure system 200, enabling viewing of handheld computer system 100 in a landscape mode. This is particularly advantageous for those handheld computer systems 100 that are configured with display controllers that provide landscape oriented display functionality.

FIG. 4 is a flowchart 400 of steps performed in accordance with one embodiment of the present invention for utilizing an enclosing system, e.g., enclosing system 200 of FIG. 2 to protect and access I/Os externally disposed on a portable electronic device, such as handheld computer system 100. Alternatively, flowchart 400 can be analogously performed utilizing interface 55 of FIG. 5B. Flowchart 400 includes processes of the present invention which, in one embodiment, are carried out by a mechanical device or a plurality of mechanical devices, e.g., lifting device 240 (d, e, or f, of FIGS. 2D, 2E, or 2F). The mechanical devices reside, in one embodiment, within enclosing system 200. Although specific steps are disclosed in flowchart 400, such steps are exemplary. That is, the present invention is well suited to performing various other steps or variations of the steps recited in FIG. 4.

In step 402 of FIG. 4, a lifting device, e.g., hinge 240 d, e, or f of FIGS. 2D, E, or F is activated (as described in FIGS. 2I–K and FIGS. 3A–3F), to reposition an edge side portion of a portable electronic device, e.g., handheld computer system 100 from a disposition within an opening of an enclosing structure (as shown in FIG. 2I and FIG. 3A) to a disposition above the enclosing structure while an opposite edge side portion of the handheld computer system remains disposed within the enclosing structure, as shown in FIG. 3B. Disposing a portion of handheld computer system 100 above the enclosing structure, as shown in FIG. 2J, provides access to the I/Os externally disposed (FIG. 1A) on said handheld computer system. The lifting device is coupled with the enclosing structure and is adapted to have coupled thereto handheld computer system 100.

In step 404 of FIG. 4, the lifting device, hinge 240, is re-activated (also described in FIGS. 2I–2K and FIGS. 3A–3F) to reposition the edge side portion of the handheld computer system from the disposition above the enclosing structure (FIG. 3B) to the disposition within the opening of the enclosing structure, as shown in FIG. 2K and FIG. 3A. The disposition of the handheld computer system within the enclosing structure provides protection to the I/Os.

In conclusion, by providing an enclosing system that enables access to and provides for I/Os externally disposed on a portable electronic device, e.g., handheld computer system 100, embodiments of the present invention enable a user to easily protect and readily access I/Os on a handheld computer system. Advantageously, this can decrease instances of accidental damage to I/Os as well as reducing the amount of dust and other particles that can infiltrate into the I/Os and into the handheld computer system, which can extend the life of the handheld computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
   an encasing structure having an opening and configured to receive and have disposed therewithin a portable computer system, said encasing structure having a length confine, a width confine and a height confine; and
   a lifting device coupled to said encasing structure and configured to couple with said portable computer system, said lifting device adapted to raise a portion of said portable computer system above said height confine without going outside said length confine or said width confine of said encasing structure and further adapted to lower said portion of said portable computer system within said encasing structure,
   wherein said encasing structure protects externally disposed ports on side surfaces of said portable computer system when said portable computer system is disposed within said encasing structure, and wherein said lifting device enables access to said externally disposed ports upon raising said portable computer system.

2. The apparatus as described in claim 1 wherein said lifting device is adapted to retain said portable computer system in a first position and in a second position.

3. The apparatus of claim 1 wherein said encasing structure comprises a length and width slightly larger than corresponding dimensions of said portable computer system enabling said portable system to be disposed therewithin.

4. The apparatus of claim 1 wherein said lifting device is adapted to raise a side edge portion of said portable computer system above said confines of said encasing structure while an opposite side edge portion of said portable computer system remains disposed within said confines of said encasing structure.

5. The apparatus of claim 1 wherein said lifting device is adapted to raise said portable computer system so that said portable computer system is entirely above said confines of said encasing structure.

6. The apparatus of claim 1 wherein said lifting device is activated in response to a push upon a surface of said portable computer system.

7. The apparatus of claim 2 wherein said first position disposes said portion of said portable computer system with said confines of said encasing structure and wherein said second position disposes said portion of said portable computer system above the confines of said encasing structure.

8. The apparatus of claim 3 wherein said encasing structure further comprises a height approximate to a height of said portable computer system.

9. A system comprising:
   a handheld computer system comprising:
   a bus;
   a processor coupled to said bus;
   a memory unit coupled to said bus for storing information;
   a plurality of externally disposed ports for providing communication of signals with said bus;
   a display screen coupled to said bus; and an enclosing structure having a length confine, a width confine and a height confine comprising:

said length confine and said width confine having dimensions slightly larger than corresponding dimensions of said handheld computer system enabling said handheld computer system to be disposed within said enclosing structure; and a lifting device coupled with said enclosing structure and adapted to raise and lower a portion of said handheld computer system above said height confine without going outside said length confine or said width confine; wherein said enclosing structure is adapted to provide protection to said externally disposed ports when said handheld computer system is disposed therewithin, and wherein said lifting device enables raising said handheld computer system to provide access to said externally disposed ports.

10. The system of claim 9 wherein said lifting device is adapted to retain said handheld computer system in a first position and a second position.

11. The system of claim 9 wherein said lifting device is adapted to raise a side edge portion of said handheld computer system outside said enclosing structure while an opposite side edge portion of said handheld computer system remains disposed within said enclosing structure.

12. The handheld computer system of claim 9 wherein said lifting device is adapted to raise said handheld computer system entirely outside said enclosing structure.

13. The handheld computer system of claim 9 wherein said lifting device is activated in response to a push upon a surface of said handheld computer system.

14. The handheld computer system of claim 10 wherein a side edge portion of said handheld computer system can be disposed in said first position while an opposite side edge portion of said handheld computer system can be disposed in said second position.

15. The handheld computer system of claim 10 wherein said first position disposes said handheld computer system outside said enclosing structure and wherein said second position disposes said handheld computer system within said enclosing structure.

16. A system for protecting externally disposed ports on a handheld computer system comprising:

enclosing means having an opening and adapted to receive and have disposed therein said handheld computer system, said enclosing means having length, width and height dimensions slightly larger than corresponding dimensions of said handheld computer system, and lifting means coupled with said enclosing means and configured to couple with said handheld computer system, said lifting means adapted to raise and lower a portion of said handheld computer system above and below said height dimension without moving outside said length and width dimensions of said enclosing means, wherein said enclosing means protects said externally disposed ports when said handheld computer system is disposed therewithin and wherein said lifting means enables access to said externally disposed ports upon raising said portion of said handheld computer system above the confines of said enclosing means.

17. The system as described in claim 16 wherein said lifting means comprises a first positioning means and a second positioning means for positioning said portion of said handheld computer system in a first position and in a second position.

18. The system as described in claim 16 wherein said lifting means is adapted to raise said handheld computer system entirely above said height dimension of said enclosing means.

19. The system as described in claim 16 wherein said lifting means is activated in response to a push upon a surface of said handheld computer system.

20. A method for protecting and accessing externally disposed ports on a handheld computer system comprising:

raising a portion of said handheld computer system above a height dimension of an enclosing structure for accessing said externally disposed ports of said handheld computer system, said raising performed via a lifting device configured to raise and lower said handheld computer, said lifting device coupled with said enclosing structure and adapted to couple with said handheld computer system, said enclosing structure having an opening adapted to receive and have disposed therewithin said handheld computer system wherein said raising positions said handheld computer system within a length dimension and a width dimension of said enclosing structure; and lowering said portion of said handheld computer system, via said lifting device, within said height dimension of said enclosing structure for protecting said externally disposed ports of said handheld computer system.

21. The method as recited in claim 20 wherein said raising raises said handheld computer entirely above said enclosing structure and wherein said lowering lowers said handheld computer system to entirely within said height dimension of said enclosing structure.

22. The method as recited in claim 20 further comprising activating said lifting device to raise and lower said handheld computer system, wherein said lifting device is activated in response to a push upon a surface of said handheld computer system.

* * * * *